United States Patent
Wang et al.

(10) Patent No.: US 10,455,482 B2
(45) Date of Patent: Oct. 22, 2019

(54) FLEXIBLE ADJUSTMENT OF UPLINK AND DOWNLINK RATIO CONFIGURATION

(71) Applicant: Intel Corporation, Santa Clara, CA (US)

(72) Inventors: Ping Wang, San Jose, CA (US); Jong-Kae Fwu, Sunnyvale, CA (US); Huaning Niu, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 15/699,684

(22) Filed: Sep. 8, 2017

(65) Prior Publication Data

US 2018/0139689 A1 May 17, 2018

Related U.S. Application Data

(63) Continuation of application No. 13/992,686, filed as application No. PCT/US2011/067665 on Dec. 28, 2011, now Pat. No. 9,794,859.

(Continued)

(51) Int. Cl.
*H04W 48/10* (2009.01)
*H04W 4/70* (2018.01)
(Continued)

(52) U.S. Cl.
CPC .......... *H04W 48/10* (2013.01); *H04B 7/0456* (2013.01); *H04B 7/0486* (2013.01);
(Continued)

(58) Field of Classification Search
CPC .................................................. H04W 48/10
(Continued)

(56) References Cited

U.S. PATENT DOCUMENTS 9,794,859 B2 * 10/2017 Wang ...................... H04W 4/70
2005/0220049 A1 10/2005 Zhang et al.
(Continued)

FOREIGN PATENT DOCUMENTS

CN 101026468 A 8/2007
CN 101400128 A 4/2009
(Continued)

OTHER PUBLICATIONS

U.S. Appl. No. 13/992,630, filed Aug. 18, 2015, Flexible Configuration of Uplink and Downlink Ratio by Exchanging Information Using an X2 Interface.
(Continued)

*Primary Examiner* — Peter G Solinsky
(74) *Attorney, Agent, or Firm* — Schwegman Lundberg & Woessner, P.A.

(57) ABSTRACT

An apparatus and method for flexible adjustment of the uplink-downlink ratio configuration for each enhanced node B (eNodeB) within a wireless communications network is disclosed herein. In one embodiment, a given eNodeB is configured to determine a current or subsequent uplink-downlink ratio configuration for a pre-determined time period. The determined current or subsequent uplink-downlink ratio configuration is encoded into a special physical downlink control channel (PDCCH), the special PDCCH included in at least one radio frame according to the pre-determined time period. The radio frame including the special PDCCH is transmitted to user equipment served by the given eNodeB.

22 Claims, 4 Drawing Sheets

Related U.S. Application Data (60) Provisional application No. 61/471,042, filed on Apr. 1, 2011.

(51) Int. Cl.

| | | |
|---|---|---|
| *H04B 7/0456* | (2017.01) | |
| *H04B 7/06* | (2006.01) | |
| *H04L 5/00* | (2006.01) | |
| *H04L 12/26* | (2006.01) | |
| *H04L 12/721* | (2013.01) | |
| *H04L 29/06* | (2006.01) | |
| *H04W 24/00* | (2009.01) | |
| *H04W 24/02* | (2009.01) | |
| *H04W 24/10* | (2009.01) | |
| *H04W 28/08* | (2009.01) | |
| *H04W 48/12* | (2009.01) | |
| *H04W 52/02* | (2009.01) | |
| *H04W 52/14* | (2009.01) | |
| *H04W 52/18* | (2009.01) | |
| *H04W 72/04* | (2009.01) | |
| *H04L 5/14* | (2006.01) | |
| *H04W 4/80* | (2018.01) | |
| *H04W 28/04* | (2009.01) | |
| *H04W 72/00* | (2009.01) | |
| *H04W 88/02* | (2009.01) | |
| *H04W 88/08* | (2009.01) | |
| *H04W 92/20* | (2009.01) | |
| *H04W 28/06* | (2009.01) | |

(52) U.S. Cl.
CPC ......... *H04B 7/0632* (2013.01); *H04B 7/0639* (2013.01); *H04L 5/003* (2013.01); *H04L 5/0037* (2013.01); *H04L 5/0053* (2013.01); *H04L 5/0082* (2013.01); *H04L 5/0094* (2013.01); *H04L 5/0096* (2013.01); *H04L 5/1469* (2013.01); *H04L 43/50* (2013.01); *H04L 45/70* (2013.01); *H04L 65/608* (2013.01); *H04W 4/70* (2018.02); *H04W 4/80* (2018.02); *H04W 24/00* (2013.01); *H04W 24/02* (2013.01); *H04W 24/10* (2013.01); *H04W 28/08* (2013.01); *H04W 48/12* (2013.01); *H04W 52/0216* (2013.01); *H04W 52/146* (2013.01); *H04W 52/18* (2013.01); *H04W 72/042* (2013.01); *H04W 72/0413* (2013.01); *H04W 72/0453* (2013.01); *H04L 5/001* (2013.01); *H04L 5/0007* (2013.01); *H04L 5/0087* (2013.01); *H04W 28/04* (2013.01); *H04W 28/06* (2013.01); *H04W 72/00* (2013.01); *H04W 88/02* (2013.01); *H04W 88/08* (2013.01); *H04W 92/20* (2013.01); *Y02D 70/00* (2018.01); *Y02D 70/1262* (2018.01); *Y02D 70/1264* (2018.01); *Y02D 70/444* (2018.01)

(58) Field of Classification Search
USPC ........................................................ 370/336
See application file for complete search history.

(56) References Cited

U.S. PATENT DOCUMENTS

| | | | |
|---|---|---|---|
| 2008/0039133 | A1 | 2/2008 | Jianglei et al. |
| 2008/0137562 | A1 | 6/2008 | Li et al. |
| 2008/0212479 | A1 | 9/2008 | Shin |
| 2009/0201838 | A1 | 8/2009 | Zhang et al. |
| 2009/0219875 | A1 | 9/2009 | Kwak et al. |
| 2009/0249153 | A1 | 10/2009 | Zhang |
| 2009/0251315 | A1 | 10/2009 | Lee et al. |
| 2010/0184437 | A1 | 7/2010 | Dimou et al. |
| 2010/0226320 | A1 | 9/2010 | Asanuma |
| 2010/0238847 | A1 | 9/2010 | Suo et al. |
| 2010/0246456 | A1 | 9/2010 | Suo et al. |
| 2010/0290370 | A1 | 11/2010 | Li et al. |
| 2011/0032855 | A1 | 2/2011 | Kim et al. |
| 2011/0111788 | A1* | 5/2011 | Damnjanovic ..... H04W 52/146 455/522 |
| 2011/0128916 | A1 | 6/2011 | Kwon et al. |
| 2011/0176461 | A1 | 7/2011 | Astely et al. |
| 2012/0026929 | A1 | 2/2012 | Wang et al. |
| 2012/0106465 | A1 | 5/2012 | Haghighat et al. |
| 2012/0120854 | A1 | 5/2012 | Zhang et al. |
| 2012/0190391 | A1 | 7/2012 | Yoo et al. |
| 2013/0136041 | A1 | 5/2013 | Hoymann et al. |
| 2013/0188531 | A1 | 7/2013 | Zhang |
| 2014/0010213 | A1 | 1/2014 | Wang et al. |
| 2016/0007232 | A1 | 1/2016 | Wang et al. |

FOREIGN PATENT DOCUMENTS

| | | | |
|---|---|---|---|
| CN | 101431362 | A | 5/2009 |
| CN | 101505507 | A | 8/2009 |
| CN | 101801023 | A | 8/2010 |
| CN | 101981994 | A | 2/2011 |
| CN | 103563272 | A | 2/2014 |
| CN | 103563478 | A | 2/2014 |
| CN | 108200653 | A | 6/2018 |
| EP | 1793635 | A1 | 6/2007 |
| EP | 2695481 | A1 | 2/2014 |
| GB | 2458258 | A | 9/2009 |
| WO | WO-2009120701 | A2 | 10/2009 |
| WO | WO-2010129295 | A1 | 11/2010 |
| WO | WO-2012134580 | A1 | 10/2012 |
| WO | WO-2012134581 | A1 | 10/2012 |

OTHER PUBLICATIONS

U.S. Appl. No. 13/992,686, filed Aug. 29, 2013, Flexible Adjustment of Uplink and Downlink Ratio Configuration.

"European Application Serial No. 18165633.1, Extended European Search Report dated Jul. 20, 2018", 6 pgs.

"Chinese Application Serial No. 201810035933.2, Voluntary Amendment filed Oct. 19, 2018", w/ English claims, 9 pgs.

3GPP TS 36.211 v. 8.9.0, (Jan. 2010), 1 pg.

"3GPP Physical Channels and Modulation (Release 8)", ((TS 36.211 V8.9.0)), 3rd Generation Partnership Project; Technical Specification Group Radio Access Network; Evolved Universal Terrestrial Radio Access (E-UTRA), (2010).

"3rd Generation Partnership Project; Technical Specification Group Radio Access Network Evolved Universal Terrestrial Radio Access Network (E-UTRAN); X2 application protocol (X2AP) (Release 10)", 3GPP Standard; 3GPP TS 36.423, 3rd Generation Partnership Project (3GPP), Mobile Competence Centre ; 650, Route Des Lucioles ; F-06921 Sophia-Anti Polis Cedex ; France, No. V1 0.0.0, (Dec. 21, 2010), 1-123.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, (Dec. 2012), 340 pgs.

"U.S. Appl. No. 13/992,630, Advisory Action dated Oct. 31, 2017", 4 pgs.

"U.S. Appl. No. 13/992,630, Examiner Interview Summary dated Sep. 18, 2017", 3 pgs.

"U.S. Appl. No. 13/992,630, Final Office Action dated Aug. 22, 2017", 22 pgs.

"U.S. Appl. No. 13/992,630, Non Final Office Action dated Feb. 10, 2017", 16 pgs.

"U.S. Appl. No. 13/992,630, Preliminary Amendment filed Jun. 7, 2013", 3 pgs.

"U.S. Appl. No. 13/992,630, Response filed Oct. 20, 2017 to Final Office Action dated Aug. 22, 2017", 11 pgs.

"U.S. Appl. No. 13/992,630, Response filed May 10, 2017 to Non Final Office Action dated Feb. 10, 2017", 12 pgs.

(56) References Cited

OTHER PUBLICATIONS

"U.S. Appl. No. 13/992,686, Advisory Action dated Nov. 24, 2015", 5 pgs.
"U.S. Appl. No. 13/992,686, Final Office Action dated Feb. 16, 2017", 17 pgs.
"U.S. Appl. No. 13/992,686, Final Office Action dated Jul. 22, 2015", 18 pgs.
"U.S. Appl. No. 13/992,686, Non Final Office Action dated Jan. 30, 2015", 15 pgs.
"U.S. Appl. No. 13/992,686, Non Final Office Action dated Jun. 16, 2016", 19 pgs.
"U.S. Appl. No. 13/992,686, Notice of Allowance dated Jun. 7, 2017", 12 pgs.
"U.S. Appl. No. 13/992,686, Preliminary Amendment filed Jun. 7, 2013", 3 pgs.
"U.S. Appl. No. 13/992,686, PTO Response to Rule 312 Communication dated Aug. 18, 2017", 2 pgs.
"U.S. Appl. No. 13/992,686, Response filed Apr. 27, 2017 to Final Office Action dated Feb. 16, 2017", 10 pgs.
"U.S. Appl. No. 13/992,686, Response filed Apr. 28, 2015 to Non Final Office Action dated Jan. 30, 2015", 12 pgs.
"U.S. Appl. No. 13/992,686, Response filed Oct. 22, 2015 to Final Office Action dated Jul. 22, 2015", 10 pgs.
"U.S. Appl. No. 13/992,686, Response filed Nov. 16, 2016 to Non final Office Action dated Jun. 16, 2016", 9 pgs.
"Chinese Application Serial No. 201180071269.3, Notice of Reexamination dated Sep. 29, 2017", w/o English translation, 12 pgs.
"Chinese Application Serial No. 201180071269.3, Office Action dated May 5, 2016", w/ English Translation, 21 pgs.
"Chinese Application Serial No. 201180071269.3, Office Action dated Aug. 20, 2015", w/ English Translation, 8 pgs.
"Chinese Application Serial No. 201180071269.3, Office Action dated Nov. 18, 2016", w/ English Translation, 21 pgs.
"Chinese Application Serial No. 201180071269.3, Response filed Feb. 27, 2017 to Office Action dated Nov. 18, 2016", w/ claims in English, 11 pgs.
"Chinese Application Serial No. 201180071269.3, Response filed Jul. 20, 2016 to Office Action dated May 5, 2016", w/ English Claims, 10 pgs.
"Chinese Application Serial No. 201180071269.3, Response filed Dec. 31, 2015 to Office Action dated Aug. 20, 2015", w/ English Claims, 7 pgs.
"Chinese Application Serial No. 201180071284.8, Office Action dated Apr. 5, 2016", w/ English Translation, 15 pgs.
"Chinese Application Serial No. 201180071284.8, Office Action dated May 16, 2017", w/ English translation, 8 pgs.
"Chinese Application Serial No. 201180071284.8, Office Action dated Nov. 28, 2016", w/ English Translation, 13 pgs.
"Chinese Application Serial No. 201180071284.8, Response filed Feb. 13, 2017 to Office Action dated Nov. 28, 2016", w/ claims in English, 7 pgs.
"Chinese Application Serial No. 201180071284.8, Response filed Aug. 22, 2016 to Office Action dated Apr. 5, 2016", 3 pgs.
"Chinese Application Serial No. 201180071284.8, Response filed Oct. 31, 2017 to Office Action dated May 16, 2017", w/ claims in English, 20 pgs.
"Dynamic Uplink/Downlink Resource Allocation for TDD OFDMA Access Network", 2009 WRI International Conference on Communications and Mobile Computing, (Jan. 1, 2009), 5 pgs.
"European Application Serial No. 11861936.0, Extended European Search Report dated Aug. 8, 2012", 11 pgs.
"European Application Serial No. 11862557.3, Extended European Search Report dated Oct. 1, 2014", 10 pgs.
"Evolved Universal Terrestrial Radio Access (E-UTRA); Medium Access Control (MAC) protocol specification", 3GPP TS 36.321 V10.5.0. Technical Specification Group Radio Access Network. Release 10., (Mar. 2012), 54 pgs.
"Evolved Universal Terrestrial Radio Access (E-UTRA); Multiplexing and channel coding", 3GPP TS 36.212 version 8.8.0 Release 8 LTE, (Jan. 2010), 62 pgs.
"Evolved Universal Terrestrial Radio Access (E-UTRA); Physical layer procedures", 3GPP TS 36.213 V11.0.0 3rd Generation Partnership Project; Technical Specification Group Radio Access Network;, (Sep. 2012), 143 pgs.
"International Application Serial No. PCT/US2011/067665, International Preliminary Report on Patentability dated Oct. 10, 2013", 6 pgs.
"International Application Serial No. PCT/US2011/067665, Search Report dated Aug. 29, 2012", 5 pgs.
"International Application Serial No. PCT/US2011/067665, Written Opinion dated Aug. 29, 2012", 4 pgs.
"International Application Serial No. PCT/US2011/067671, International Preliminary Report on Patentability dated Oct. 10, 2013", 6 pgs.
"International Application Serial No. PCT/US2011/067671, International Search Report dated Aug. 14, 2012", 5 pgs.
"International Application Serial No. PCT/US2011/067671, Written Opinion dated Aug. 14, 2012", 4 pgs.
"Physical Channels and Modulation", 3GPP TS 36.211 V11.2.0(Release 11), (Feb. 2013), 109 pgs.
"TD-LTE: Exciting Alternative, Global Momentum", White Paper. Motorola., [online]. Retrieved from the Internet: <URL: http://www.tdia.cn/test/en/downloa/20111214.pdf>, (Jul. 20, 2010), 12 pgs.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

| Value (hexa-decimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | DU-RNTI (Used for one additional type of PDCCHs to indicate the uplink-downlink configuration of the current or subsequent radio frames) |
| FFFD | M-RNTI |
| FFFE | P-RNTI |
| FFFF | SI-RNTI |

FLEXIBLE ADJUSTMENT OF UPLINK AND DOWNLINK RATIO CONFIGURATION

CROSS-REFERENCE TO RELATED APPLICATIONS

This application is a continuation of U.S. patent application Ser. No. 13/992,686, filed Aug. 29, 2013, which is a U.S. National Stage Filing under 35 U.S.C. 371 from International Application No. PCT/US2011/067665, filed Dec. 28, 2011 and published in English as WO 2012/134580 on Oct. 4, 2012, which claims priority to U.S. Provisional Patent Application No. 61/471,042 entitled "Advanced Wireless Communication Systems and Techniques" filed on Apr. 1, 2011, the contents of which are incorporated herein by reference in their entireties.

This application is related to International Application No. PCT/US2011/067671, entitled "Flexible Configuration of Uplink and Downlink Ratio by Exchanging Information Using An X2 Interface", filed Dec. 28, 2011.

TECHNICAL FIELD

The present disclosure relates generally to wireless communications. More particularly, the present disclosure relates to changing uplink and downlink ratio configurations within wireless communication systems.

BACKGROUND

In the current 3rd Generation Partnership Project (3GPP) long term evolution (LTE) time division duplex (TDD)-Advanced systems, the same frequency bands are used for the uplink and downlink transmissions between enhanced node Bs (eNodeBs) and user equipment (UE). Uplink and downlink transmissions are separated by transmitting either uplink data or downlink data at each pre-determined block of time, known as subframes, on the same frequency bands. In TDD deployment, the uplink and downlink transmissions are structured into radio frames, each 10 ms in time length. Each radio frame may comprise a single frame or two half-frames of each 5 ms in time length. Each half-frame, in turn, may comprise five subframes of 1 ms time length each. Particular designations of subframes within a radio frame for uplink or downlink transmission—referred to as uplink and downlink configurations—can be defined. The seven supported uplink and downlink configurations (also referred to UL/DL configurations, uplink-downlink configurations, or uplink-downlink ratio configurations) are shown in a table 100 of FIG. 1, in which "D" denotes a subframe reserved for downlink transmission, "U" denotes a subframe reserved for uplink transmission, and "S" denotes a special subframe which includes the downlink pilot time slot (DwPTS), guard period (GP) and uplink pilot time slot (UpPTS) fields. Note, among other things, that some configurations have more uplink subframes than other configurations. For example, Configuration 0 has six uplink subframes while Configuration 2 has two uplink subframes.

Once the evolved universal terrestrial radio access network (EUTRAN) decides which one of the above uplink-downlink configurations applies for a given enhanced Node B (eNB or eNodeB), this configuration is not changed during normal operation of the cell or cells served by the eNodeB. This is the case even when uplink or downlink transmission loads are mismatched to the current uplink-downlink configuration. Current 3GPP LTE-Advanced systems do not support flexible adjustment of the uplink and downlink ratio configurations for eNodeBs.

DETAILED DESCRIPTION

The following description is presented to enable any person skilled in the art to create and use a computer system configuration and related method and article of manufacture to adjust the uplink-downlink ratio configuration in each carrier frequency of eNodeBs within a wireless communications network. In one embodiment, each eNodeB determines or schedules a current or subsequent uplink-downlink ratio configuration based on system/cell information, and generates configuration information for a special PDCCH indicative of the determined current or subsequent uplink-downlink ratio configuration. The special PDCCH is included in a first subframe of at least one radio frame according to a pre-determined time period. The special PDCCH included in the radio frame is detected by user equipment served by the particular eNodeB to appropriately communicate downlink and uplink data with the eNodeB.

Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Figure 2:
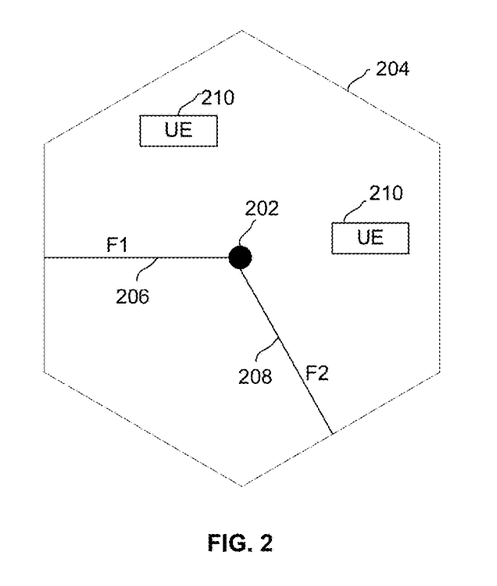
FIG. 2 illustrates an example (portion) of a wireless communications network according to some embodiments.

FIG. 2 illustrates an example (portion) of a wireless communications network 200 according to some embodiments. In one embodiment, the wireless communications network 200 comprises an evolved universal terrestrial radio access network (EUTRAN) using the 3rd Generation Partnership Project (3GPP) long term evolution (LTE) standard and operates in time division duplex (TDD) mode. The wireless communications network 200 includes an enhanced Node B (eNodeB or eNB) 202 and a plurality of user equipments (UEs) 210.

The eNodeB 202 (also referred to as a base station) is configured to serve a certain geographic area, denoted as a cell 204. The UEs 210 located within the cell 204 are served by the eNodeB 202. The eNodeB 202 is configured to communicate with the UEs 210 on a first carrier frequency 206 (F1) (e.g., the primary carrier component) and optionally, one or more secondary carrier frequencies, such as a second carrier frequency 208 (F2) (e.g., the secondary carrier component). For ease of illustration, only a single eNodeB is shown in FIG. 2. However, it is understood that the wireless communications network 200 includes more than one eNodeB, each of the eNodeBs serving a particular cell which may or may not neighbor the eNode 202.

The UEs 210 may comprise a variety of devices configured to communicate within the wireless communications network 200 including, but not limited to, cellular telephones, smart phones, tablets, laptops, desktops, personal computers, servers, personal digital assistants (PDAs), web appliances, set-top box (STB), a network router, switch or bridge, and the like. One or more UEs 210 may move into or out of the cell 204 at any given time.

In one embodiment, the UEs 210 located in the cell 204 transmits data to the eNodeB 202 (uplink transmission) and receives data from the eNodeB 202 (downlink transmission) using radio frames comprising Orthogonal Frequency-Division Multiple Access (OFDMA) frames configured for time division duplex (TDD) operations. Each of the radio frames comprises a plurality of uplink and downlink subframes, the uplink and downlink subframes configured in accordance with the uplink-downlink ratio configuration selected from among the supported uplink-downlink ratio configurations shown in table 100 of FIG. 1. (See 3GPP TS 36.211Version 9.1.0, E-UTRA Physical Channels and Modulation (Release 9), March 2010.)

Figure 3:
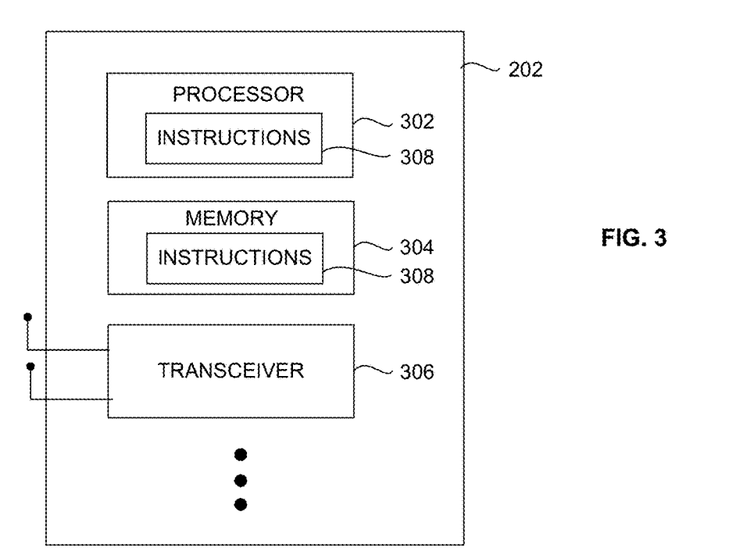
FIG. 3 illustrates an example block diagram showing details of the eNodeB included in the wireless communications network of FIG. 2 according to some embodiments.

FIG. 3 illustrates an example block diagram showing details of the eNodeB 202 according to some embodiments. The eNodeB 202 includes a processor 302, a memory 304, a transceiver 306, instructions 308, and other components (not shown). The processor 302 comprises one or more central processing units (CPUs), graphics processing units (GPUs), or both. The processor 302 is configured to provide processing and control functionalities for the eNodeB 202. The memory 304 comprises one or more transient and static memory units configured to store instructions, data, setting information, and the like for the eNodeB 202. The transceiver 306 comprises one or more transceivers configured to receive uplink receptions and transmit downlink transmissions with the UEs 210 within range of the eNodeB 202. The transceiver 306 includes a multiple-input and multiple-output (MIMO) antenna to support MIMO communications.

The instructions 308 comprises one or more sets of instructions or software executed on a computing device (or machine) to cause such computing device (or machine) to perform any of the methodologies discussed herein. The instructions 308 (also referred to as computer- or machine-readable instructions) may reside, completely or at least partially, within the processor 302 and/or memory 304 during execution thereof. The processor 302 and memory 304 also comprise machine-readable media. In one embodiment, the processor 302 is configured to execute the instructions 308 to cause operations associated with adjusting the uplink-downlink ratio configuration for a given eNodeB (e.g., eNodeB 202) on a dynamic or semi-static bases, as described in detail below.

Figure 4:
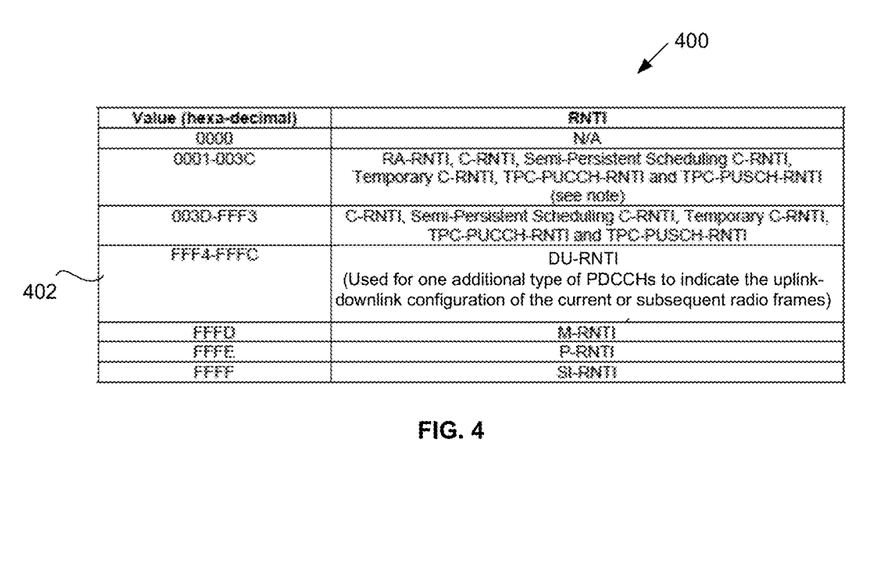
FIG. 4 illustrates an example table of radio network temporary identifier (RNTI) values for use in 3GPP LTE-Advanced systems operating in TDD mode according to some embodiments.

FIG. 4 illustrates an example table 400 of radio network temporary identifier (RNTI) values for use in 3GPP LTE-Advanced systems operating in TDD mode according to some embodiments. In the current technical specification, the RNTI values FFF4-FFFC are reserved for future use. (See 3GPP TS 36.321Version 9.3.0, E-UTRA Medium Access Control Protocol Specification (Release 9), June 2010.) In contrast, table 400 includes an entry 402 comprising a usage definition for RNTI values FFF4-FFFC. In one embodiment, RNTI values FFF4-FFFC are designated for a downlink-uplink-radio network temporary identifier (DU-RNTI). DU-RNTI represents one additional type of physical downlink control channels (PDCCHs) indicating the uplink-downlink ratio configuration of the current and/or subsequent radio frames. To specify the new/additional type of PDCCH, the cyclic redundancy check (CRC) bits of this PDCCH are masked with one RNTI value, e.g., one or more of FFF4-FFFC.

This PDCCH may be placed in the first subframe of one or more radio frames, in which at least a 3-bit signaling scheme is used to indicate which uplink-downlink ratio configuration is applicable for the current and/or subsequent radio frames. In one embodiment, the 3-bit signaling scheme can be defined as follows, corresponding to the currently supported uplink-downlink ratio configurations in table 100 (FIG. 1) in order to avoid redesigning the existing hybrid automatic repeat request (HARQ).

Figure 1:
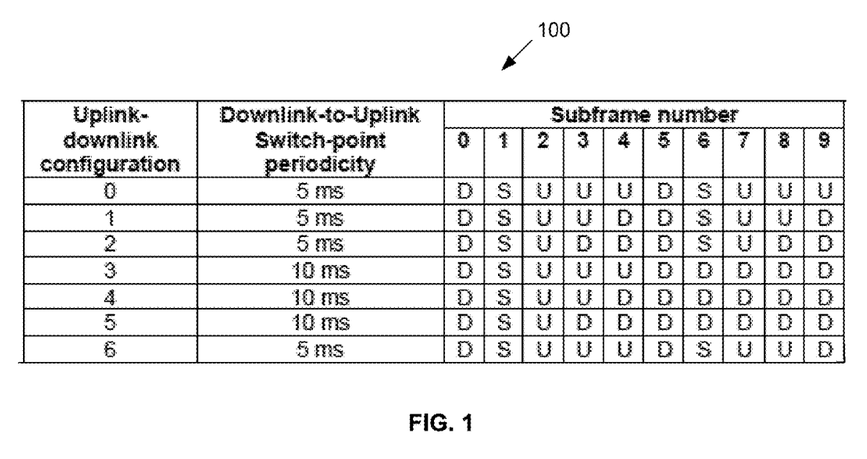
FIG. 1 illustrates supported uplink-downlink ratio configurations under the current 3GPP LTE TDD-Advanced standard.

| 3-bit signaling | Uplink-downlink configuration |
| --- | --- |
| 000 | 0 |
| 001 | 1 |
| 010 | 2 |
| 011 | 3 |
| 100 | 4 |
| 101 | 5 |
| 110 | 6 |
| 111 | Reserved |

In another embodiment, a different encoding scheme may be implemented for the new type of PDCCH, as long as the scheme is capable of specifying each of the uplink-downlink ratio configurations possible within the wireless communications network 200.

Figure 5:
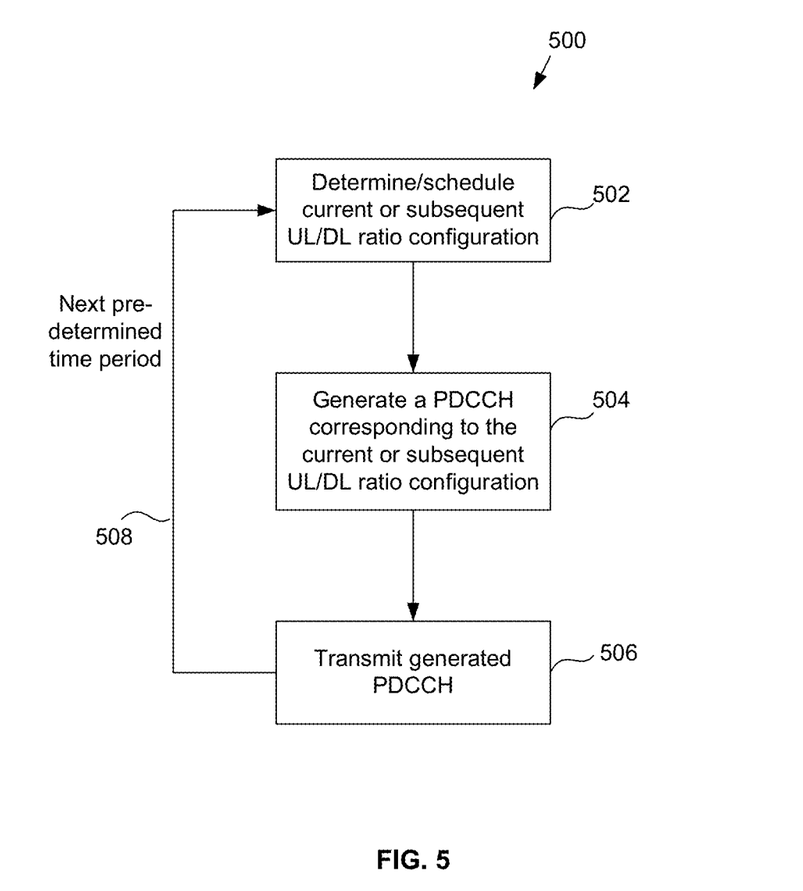
FIG. 5 illustrates an example flow diagram for dynamically or semi-statically adjusting the uplink-downlink ratio configuration for each eNodeB included in the wireless communications network of FIG. 2 according to some embodiments.

FIG. 5 illustrates an example flow diagram 500 for dynamically or semi-statically adjusting the uplink-downlink ratio configuration for each eNodeB included in the wireless communications network 200 according to some embodiments. Using the encoding scheme of the new type of PDCCH (DU-RNTI) described above, each eNodeB communicates to the UEs what the current or subsequent uplink-downlink ratio configuration is for the cell served by the given eNodeB per a particular time period. The scheduled current or subsequent uplink-downlink ratio configuration may be unchanged or changed from the existing configuration at the given eNodeB. The discussion below is made with respect to eNodeB 202; however, it is understood that each eNodeB within the wireless communications network 200 performs the process shown in flow diagram 500.

At a block 502, the eNodeB 202 is configured to schedule a current or subsequent uplink-downlink ratio configuration (also referred to as a new uplink-downlink ratio configuration, or current or future uplink-downlink ratio configuration) for a pre-determined time period. The eNodeB 202 determines if the operating uplink-downlink ratio configuration for the cell 204 should be changed based on system/cell information relating to user traffic pattern. The eNodeB 202 can exchange system/cell information relating to user traffic pattern (e.g., downlink and uplink power transmission/reception or load information) with neighboring eNodeBs, and use such system/cell information to determine if the operating uplink-downlink ratio configuration is mismatched to the actual user traffic pattern. Details regarding obtaining and exchanging system/cell information relating to user traffic pattern are provided in PCT Patent Application entitled "Flexible Configuration of Uplink and Downlink Ratio by Exchanging Information Using An X2 Interface", filed concurrently herewith.

As an example, if the system/cell information indicates that the uplink subframes of the operating uplink-downlink ratio configuration are carrying a high traffic load and the downlink subframes are carrying a low traffic load, the eNodeB 202 may decide to change to a different uplink-downlink ratio configuration that includes more uplink subframes than the operating uplink-downlink ratio configuration. If, for example, the operating configuration is Configuration 4 (which has two uplink subframes and seven downlink subframes per radio frame), the eNodeB 202 may determine that switching to Configuration 1 (which has four uplink subframes per radio frame) better serves the UEs 210 within the cell 204.

On the other hand, if the system/cell information relating to user traffic pattern is such that the operating configuration is found to be adequate, the current or subsequent uplink-downlink ratio configuration determined by the eNodeB 202 may comprise the (existing) operating configuration. In any case, the eNodeB 202 has determined or scheduled what the current or subsequent uplink-downlink ratio configuration will be for the pre-determined time period.

Next at a block 504, the eNodeB 202 is configured to generate the new type of PDCCH masked with the above-defined DU-RNTI corresponding to the current or subsequent uplink-downlink ratio configuration determined in block 502. This PDCCH may also be referred to as a special PDCCH, new PDCCH, or PDCCH indicative (or associated with) the uplink-downlink configuration. The eNodeB 202 is configured to schedule the PDCCH masked with the DU-RNTI, which can be one or more of values FFF4-FFFC, in the PDCCH region of the first subframe of at least one radio frame in accordance with the current or subsequent uplink-downlink ratio configuration scheduled by the eNodeB 202. Whether every radio frame includes the PDCCH masked with the DU-RNTI depends on the pre-determined time period, as discussed in detail below. In the case that the physical downlink shared channel (PDSCH) on a secondary cell (Scell) for the eNodeB 202 is scheduled by the primary cell (Pcell), the PDCCH masked with the DU-RNTI transmits only on the Pcell. In the case that the PDSCH on the Scell is scheduled by the Scell itself, then the PDCCH masked with the DU-RNTI transmits only on the Scell.

Once the PDCCH includes information representative of the scheduled current or subsequent uplink-downlink ratio configuration, the eNodeB 202 is configured to transmit the radio frame including such PDCCH in accordance with the pre-determined time period (block 506). In one embodiment, the transmission comprises a broadcast to all of the UEs 210 served by the eNodeB 202. The UEs 210 are configured to monitor transmissions from the eNodeB 202 at each of the pre-determined time periods for the PDCCH masked with the DU-RNTI, in the PDCCH region of the first subframe of a radio frame. Upon detection of such PDCCH, the current or subsequent uplink-downlink ratio configuration scheduled by the eNodeB 202 is now known by the UEs 210. The UEs 210 adjust accordingly to communicate uplink and downlink data with the eNodeB 202.

Blocks 502-506 are repeated by the eNodeB 202 for each pre-determined time period (loop 508). In one embodiment, the pre-determined time period comprises a radio frame time length (e.g., 10 ms) and the PDCCH masked with the DU-RNTI is included in the first subframe of each radio frame. Thus, dynamic indication of the uplink-downlink configuration is provided by each eNodeB within the wireless communications network 200. Compared to RRC signaling—the traditional way to set the uplink-downlink configuration (with no option for subsequent adjustment)—this scheme provides low latency and high flexibility to adapt to the changing traffic scenario. However, there is the possibility of low reliability in the blind detection of this PDCCH if the aggregation level of control channel elements (CCEs) for this PDCCH is small. Such low reliability potential may be improved by increasing the aggregation level of CCEs for this PDCCH. For example, the aggregation level of CCEs may be set to 4 or 8.

Figure 6A:
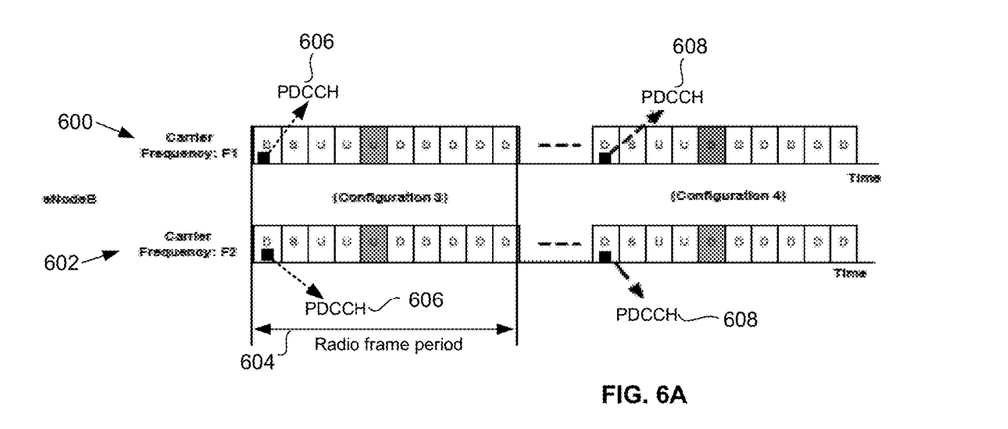
FIGS. 6A-6C illustrate example diagrams showing radio frames including a special PDCCH according to different pre-determined time periods according to some embodiments.

FIG. 6A illustrates an example diagram showing dynamic indication of the uplink-downlink ratio configuration via a special PDCCH in the first subframe of each radio frame according to some embodiments. FIG. 6A shows radio frames 600 associated with the first carrier frequency 206 (F1) and radio frames 602 associated with the second carrier frequency 208 (F2) for the eNodeB 202. A radio frame time period 604 comprises the pre-determined time period in FIG. 6A. A PDCCH masked with the DU-RNTI 606 is included in each of the first subframe of at least one radio frame of the radio frames 600, 602, respectively. The PDCCH 606 is encoded with a signal indicative of Configuration 4, for example, and FIG. 6A shows the radio frames 600, 602 dynamically adjusted to Configuration 4 from the existing Configuration 3. A PDCCH masked with the DU-RNTI 608 included in each of the first subframe of a radio frame of the radio frames 600, 602, respectively, indicates the current or subsequent uplink-downlink configuration determined for another radio frame time period.

In another embodiment, the pre-determined time period comprises a monitoring period that is periodic and which is a larger time length than a radio frame time length. As an example, the monitoring period may be 420 ms, 7 hours, 14 hours, 7 days, 14 days, and the like. Using a pre-determined time period that is less frequent than a radio frame time length reduces the amount of monitoring of the special PDCCH required by the UEs 210, thereby lowering the power consumption of the UEs 210. The UEs 210 can expect to detect a special PDCCH once per monitoring period, and the eNodeB 202 may transmit the special PDCCH in the first subframe of each radio frame according to at least the monitoring period (rather than in every radio frame). Thus, the uplink-downlink ratio configuration can be adjusted, at most, once each monitoring period.

The monitoring period may be providing in the RRC signaling. Provided below is an example portion of the TDD-Config information element, wherein a field "monitoringPeriod" field can be one RRC signaling added to specify the monitoring period.

```
-- ASN1START
TDD-Config ::=        SEQUENCE {
```

-continued

```
    subframeAssignment         ENUMERATED {
                               sa0, sa1, sa2, sa3, sa4, sa5, sa6},
    specialSubframePatterns    ENUMERATED {
                               ssp0, ssp1, ssp2, ssp3, ssp4, ssp5, ssp6,
                               ssp7, ssp8}
    monitoringPeriod           ENUMERATED {
                               atp0, atp1, atp2, atp3, ..., atpm}
}
-- ASN1STOP
```

In which atp0 represents no adjustment (e.g., the uplink and downlink ratio configuration is not changed), atp1 represents a 420 ms adjustment period, atp2 represents a 7 hour adjustment period, atp3 represents a 14 hour adjustment period, atpm represents a 14 day adjustment period, etc.

Figure 6B:
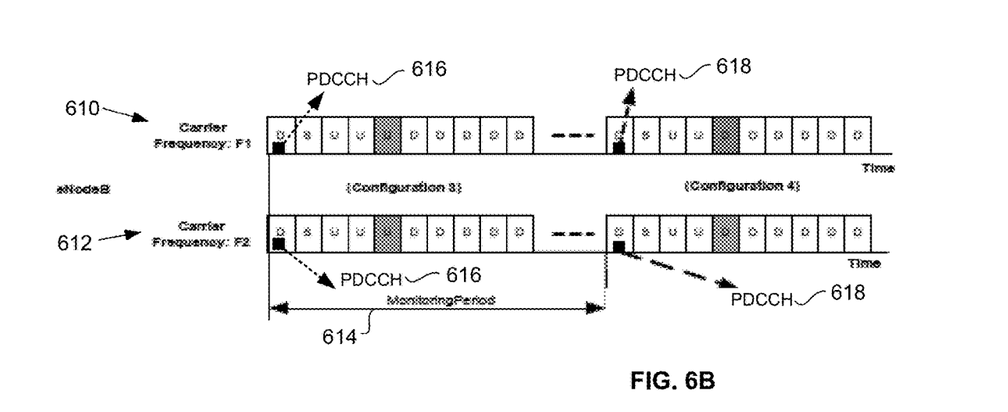

FIG. 6B illustrates an example diagram showing semi-static indication of the uplink-downlink ratio configuration via a special PDCCH in the first subframe of each radio frame according to the monitoring period according to some embodiments. FIG. 6B shows radio frames 610 associated with the first carrier frequency 206 (F1) and radio frames 612 associated with the second carrier frequency 208 (F2) for the eNodeB 202. A monitoring period 614 comprises the pre-determined time period in FIG. 6B. A PDCCH masked with the DU-RNTI 616 is included in each of the first subframe of a radio frame of the radio frames 610, 612, respectively. The PDCCH 616 is encoded with a signal indicative of Configuration 4, for example, and FIG. 6B shows the radio frames 610, 612 being semi-static adjusted to Configuration 4 from the existing Configuration 3. A PDCCH masked with the DU-RNTI 618 included in each of the first subframe of a radio frame of the radio frames 610, 612, respectively, indicates the current or subsequent uplink-downlink configuration determined for another monitoring period.

In still another embodiment, the pre-determined time period comprises an adjustment period that is longer than a radio frame time length and which may be periodic or non-periodic. In other words, the adjustment period may be ad hoc. Considering the different number of complete HARQ process transmissions and re-transmissions for the supported uplink-downlink configurations—for example, 20 ms for Configuration 1 to 5, 70 ms for Configuration 0, and 60 ms for Configuration 6—the adjustment period may be at least a multiple integer of 20 ms, 70 ms, or 60 ms, such as 420 seconds, 7 hours, 14 hours, 14 days, and the like.

The eNodeB 202 can be configured to adjust the uplink-downlink configuration in each carrier frequency as the need arises by specifying the adjustment period in the RRC signaling before the adjustment period commences (so that the UEs 210 will know when to monitor the radio frames for a special PDCCH), and then providing the special PDCCH in the first subframe of at least one radio frame according to the adjustment period. Provided below is an example portion of the TDD-Config information element, wherein a field "subframeReassignmentPeriod" can be one RRC signaling added to specify the adjustment period.

```
-- ASN1START
TDD-Config ::=                 SEQUENCE {
    subframeAssignment         ENUMERATED {
                               sa0, sa1, sa2, sa3, sa4, sa5, sa6},
    specialSubframePatterns    ENUMERATED {
                               ssp0, ssp1, ssp2, ssp3, ssp4, ssp5,
                               ssp6, ssp7, ssp8}
    subframeReassignmentPeriod ENUMERATED {
                               atp0, atp1, atp2, atp3, ..., atpm}
}
-- ASN1STOP
```

In which atp0 represents no adjustment (e.g., the uplink and downlink ratio configuration is not changed), atp1 represents a 420 second adjustment period, atp2 represents a 7 hour adjustment period, atp3 represents a 14 hour adjustment period, atpm represents a 14 day adjustment period, etc.

Figure 6C:
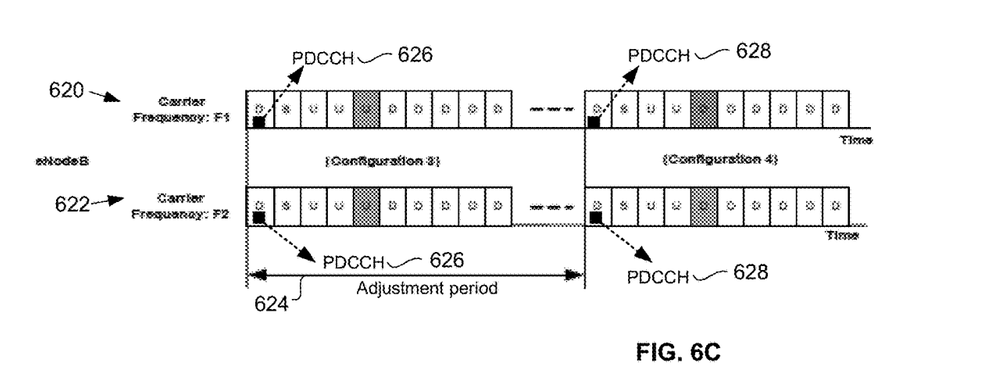

FIG. 6C illustrates an example diagram showing semi-statically indicated uplink-downlink ratio configuration via a special PDCCH in the first subframe of each radio frame according to the adjustment period according to some embodiments. FIG. 6C shows radio frames 620 associated with the first carrier frequency 206 (F1) and radio frames 622 associated with the second carrier frequency 208 (F2) for the eNodeB 202. An adjustment period 624 comprises the pre-determined time period in FIG. 6C. A PDCCH masked with the DU-RNTI 626 is included in each of the first subframe of a radio frame of the radio frames 620, 622, respectively. The PDCCH 626 is encoded with a signal indicative of Configuration 4, for example, and FIG. 6C shows the radio frames 620, 622 semi-statically adjusted to Configuration 4 from the existing Configuration 3. A PDCCH masked with the DU-RNTI 628 included in each of the first subframe of a radio frame of the radio frames 620, 622, respectively, indicates the current or subsequent uplink-downlink configuration determined for another adjustment period.

Accordingly, an encoding scheme for flexible adjustment of the uplink-downlink ratio configuration for each eNodeB within a LTE-TDD network is disclosed. Each eNodeB determines a current or subsequent uplink-downlink configuration for each carrier frequency served by that eNodeB according to a pre-determined time period, in which such configuration may be the same or different from the eNodeB's existing operating uplink-downlink configuration. The eNodeB then generates a special PDCCH masked with a DU-RNTI indicating the determined current or subsequent uplink-downlink configuration. This special PDCCH is included in the first subframe of at least one radio frame according to the pre-determined time period. The UEs served by the given eNodeB are instructed to monitor for the special PDCCH according to the pre-determined time period via, for example, a RRC signaling information. The pre-determined time period may comprise a radio frame time period, a monitoring period that is periodic and longer than the radio frame time period, or an adjustment period that is periodic or non-periodic and longer than the radio frame time period.

The term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the spirit and scope of the invention.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of an enhanced Node B (eNB), the apparatus comprising:
    a memory; and
    processing circuitry configured to:
    decode an overload indication and a first uplink/downlink (UL/DL) configuration received from a neighboring eNB;
    adapt a second UL/DL configuration for at least one user equipment (UE) responsive to the received overload indication and first UL/DL configuration;
    encode the adapted second UL/DL configuration in downlink control information (DCI) of a physical downlink control channel (PDCCH);
    scramble a cyclic redundancy check (CRC) for the PDCCH with a radio network temporary identifier (RNTI) reserved for signaling UL/DL configurations; and
    encode the PDCCH for transmission to the at least one UE,
    wherein the memory is configured to store the adapted second UL/DL configuration.

2. The apparatus of claim 1, wherein the processing circuitry is further configured to signal, via a radio resource control (RRC) information element (IE), a number of radio frames for which the adapted second UL/DL configuration applies.

3. The apparatus of claim 1, wherein the adapted second UL/DL configuration includes respective indicators for UL subframes, DL subframes and at least one special subframe and the processing circuitry is further configured to:
    further adapt the adapted second UL/DL configuration to change at least one of the UL subframe indicators and the at least one special subframe indicator of the adapted second UL/DL configuration to a DL subframe indicator in the further adapted second UL/DL configuration;
    encode the further adapted second UL/DL configuration in a further DCI of a further PDCCH;
    scramble a further CRC of the further PDCCH with the RNTI reserved for signaling the UL/DL configurations; and
    encode the further PDCCH for transmission to the at least one UE, wherein the memory is configured to store the further adapted second UL/DL configuration.

4. The apparatus of claim 3, wherein the at least one UE includes a first UE and a second UE and the processing circuitry is configured to encode the PDCCH for transmission to the first UE and to encode the further PDCCH for transmission to the second UE.

5. The apparatus of claim 1, wherein the processing circuitry is configured to exchange information relating to a user traffic pattern with the neighboring eNB.

6. The apparatus of claim 1, wherein the information relating to the user traffic pattern includes at least one of uplink transmission power, downlink transmission power, or load information.

7. The apparatus of claim 1, wherein the processing circuitry is further configured to signal, via a radio resource control (RRC) information element (IE) an amount of time between successive PDCCH transmissions containing respective adapted UL/DL configurations.

8. The apparatus of claim 1, wherein the at least one UE includes one UE and wherein the eNB and the one UE are configured as a primary cell and a secondary cell and the processing circuitry is further configured to encode the PDCCH for transmission to the one UE via the primary cell when the primary cell schedules physical uplink shared channel (PUSCH) transmissions from the one UE for the secondary cell.

9. The apparatus of claim 1, wherein the at least one UE includes one UE and wherein the eNB and the one UE are configured as a primary cell and a secondary cell and the processing circuitry is further configured to cause the eNB to transmit the PDCCH to the one UE via the secondary cell when the secondary cell schedules physical uplink shared channel (PUSCH) transmissions from the one UE to the eNB.

10. The apparatus of claim 1, wherein the at least one UE includes a plurality of UEs and the processing circuitry is further configured to encode the PDCCH for transmission to the plurality of UEs.

11. A non-transitory computer-readable medium including instructions for execution by processing circuitry of an enhanced Node B (eNB), the instructions, when executed by the processing circuitry, cause the processing circuitry to:
    decode an overload indication and a first uplink/downlink (UL/DL) configuration received from a neighboring eNB;
    adapt a second UL/DL configuration for at least one user equipment (UE) responsive to the received overload indication and the received first UL/DL configuration;
    encode the adapted second UL/DL configuration in downlink control information (DCI) of a physical downlink control channel (PDCCH);

scramble a cyclic redundancy check (CRC) for the PDCCH with a radio network temporary identifier (RNTI) reserved for signaling UL/DL configurations; and encode the PDCCH for transmission to the at least one UE.

12. The non-transitory computer-readable medium of claim 11, wherein the instructions further cause the processing circuitry to exchange information relating to a user traffic pattern with the neighboring eNB.

13. The non-transitory computer-readable medium of claim 11, wherein the instructions further cause the processing circuitry to exchange information relating to at least one of uplink transmission power, downlink transmission power, or load information with the neighboring eNB.

14. The non-transitory computer-readable medium of claim 11, wherein the instructions further cause the processing circuitry to signal, via a radio resource control (RRC) information element (IE), a number of radio frames for which the determined UL/DL configuration applies.

15. The non-transitory computer-readable medium of claim 11, wherein the instructions further cause the processing circuitry to signal, via a radio resource control (RRC) information element (IE), an amount of time between successive PDCCH transmissions containing respective UL/DL configurations.

16. The non-transitory computer-readable medium of claim 11, wherein the adapted second UL/DL configuration includes respective indicators for UL subframes, DL subframes and at least one special subframe and the instructions further cause the processing circuitry to:

further adapt the second adapted UL/DL configuration to change at least one of the UL subframe indicator and the at least one special subframe indicator of the adapted second UL/DL configuration to a DL subframe indicator in the further adapted second UL/DL configuration;

encode the further UL/DL configuration in further DCI of a further PDCCH;

scramble a further CRC for the further PDCCH with the RNTI reserved for signaling UL/DL configurations; and encode the further PDCCH for transmission to the at least one UE.

17. The non-transitory computer-readable medium of claim 11, wherein the at least one UE includes a first UE and a second UE and the instructions further cause the processing circuitry to encode the PDCCH for transmission to the first UE and to encode the further PDCCH for transmission to the second UE.

18. The non-transitory computer-readable medium of claim 11, wherein the at least one UE includes one UE and wherein the eNB and the one UE are configured as a primary cell and a secondary cell and the instructions further cause the processing circuitry to cause the eNB to transmit the PDCCH to the one UE via the primary cell when the primary cell schedules physical uplink shared channel (PUSCH) transmissions for the secondary cell.

19. The non-transitory computer-readable medium of claim 11, wherein the at least one UE includes one UE and wherein the eNB and the one UE are configured as a primary cell and a secondary cell and the instructions further cause the processing circuitry to cause the eNB to transmit the PDCCH to the one UE via the secondary cell when the secondary cell schedules physical uplink shared channel (PUSCH) transmissions.

20. The non-transitory computer-readable medium of claim 11, wherein the at least one UE includes a plurality of UEs and the instructions further cause the processing circuitry to encode the PDCCH for transmission to the plurality of UEs.

21. An apparatus of an enhanced Node B (eNB), the apparatus comprising:

a memory; and
processing circuitry configured to:
adapt a second UL/DL configuration for at least one user equipment (UE) responsive to a received overload indication and a first UL/DL configuration;

encode the adapted second UL/DL configuration in downlink control information (DCI) of a physical downlink control channel (PDCCH);

scramble a cyclic redundancy check (CRC) for the PDCCH with a radio network temporary identifier (RNTI) reserved for signaling UL/DL configurations; and encode the PDCCH for transmission to the at least one UE, signal, via a radio resource control (RRC) information element (IE), a number of radio frames for which the adapted second UL/DL configuration applies, wherein the memory is configured to store the adapted second UL/DL configuration.

22. The apparatus of claim 21, wherein the adapted second UL/DL configuration includes respective indicators for UL subframes, DL subframes and at least one special subframe and the processing circuitry is further configured to:

further adapt the adapted second UL/DL configuration to change at least one of the UL subframe indicators and the at least one special subframe indicator of the adapted second UL/DL configuration to a DL subframe indicator in the further adapted second UL/DL configuration;

encode the further adapted second UL/DL configuration in a further DCI of a further PDCCH;

scramble a further CRC of the further PDCCH with the RNTI reserved for signaling the UL/DL configurations; and encode the further PDCCH for transmission to the at least one UE, wherein the memory is configured to store the further adapted second UL/DL configuration.

* * * * *